United States Patent [19]
Hori

[11] Patent Number: 4,739,674
[45] Date of Patent: Apr. 26, 1988

[54] VIBRATION DAMPER
[75] Inventor: Masaki Hori, Tokyo, Japan
[73] Assignee: Seiko Giken Kabushiki Kaisha, Tokyo, Japan
[21] Appl. No.: 328,713
[22] Filed: Dec. 8, 1981
[30] Foreign Application Priority Data

| Dec. 11, 1980 | [JP] | Japan | 55-173804 |
| Dec. 23, 1980 | [JP] | Japan | 55-184226[U] |
| Dec. 27, 1980 | [JP] | Japan | 55-187630[U] |
| Feb. 20, 1981 | [JP] | Japan | 56-23151 |
| Mar. 5, 1981 | [JP] | Japan | 56-30503 |
| Mar. 5, 1981 | [JP] | Japan | 56-29695[U] |

[51] Int. Cl.$^4$ .................... B62K 21/26; G05G 1/04
[52] U.S. Cl. ............................ 74/551.9; 74/558.5
[58] Field of Search ................... 74/551.9, 558.5

[56] References Cited
U.S. PATENT DOCUMENTS

| 578,021 | 3/1897 | Morse | 74/551.9 |
| 627,227 | 6/1899 | Fenton | 74/551.9 |
| 630,649 | 8/1899 | Briggs | 74/551.9 |
| 1,030,866 | 7/1912 | Boast et al. | 74/551.9 |
| 1,303,803 | 5/1919 | Kennedy | 74/551.9 |

FOREIGN PATENT DOCUMENTS

| 77984 | 1/1949 | Czechoslovakia | 74/551.9 |
| 417174 | 11/1910 | France | 74/551.9 |

Primary Examiner—James A. Leppink
Assistant Examiner—Thuy M. Bui
Attorney, Agent, or Firm—Wood, Dalton, Phillips, Mason & Rowe

[57] ABSTRACT

A vibration damper for a vibrational mechanical body, such as a chain saw or motorcycle, which is a source of vibration, comprises a support, such as an arm of the vibrational body for manipulation, a cylindrical grip mounted on the support, and a vibration-damping means consisting of a pair of coiled springs having a row of small and large coiled portions and disposed between the support and the rigid grip, with each of the small coiled portions being engaged with and supported by the support and each large coiled portion by the inner surface of the grip, whereby the vibration transmitted from the vibrational body to the support is absorbed by the vibration-damping coiled spring to control or lessen the vibration transmission to the grip.

5 Claims, 28 Drawing Sheets

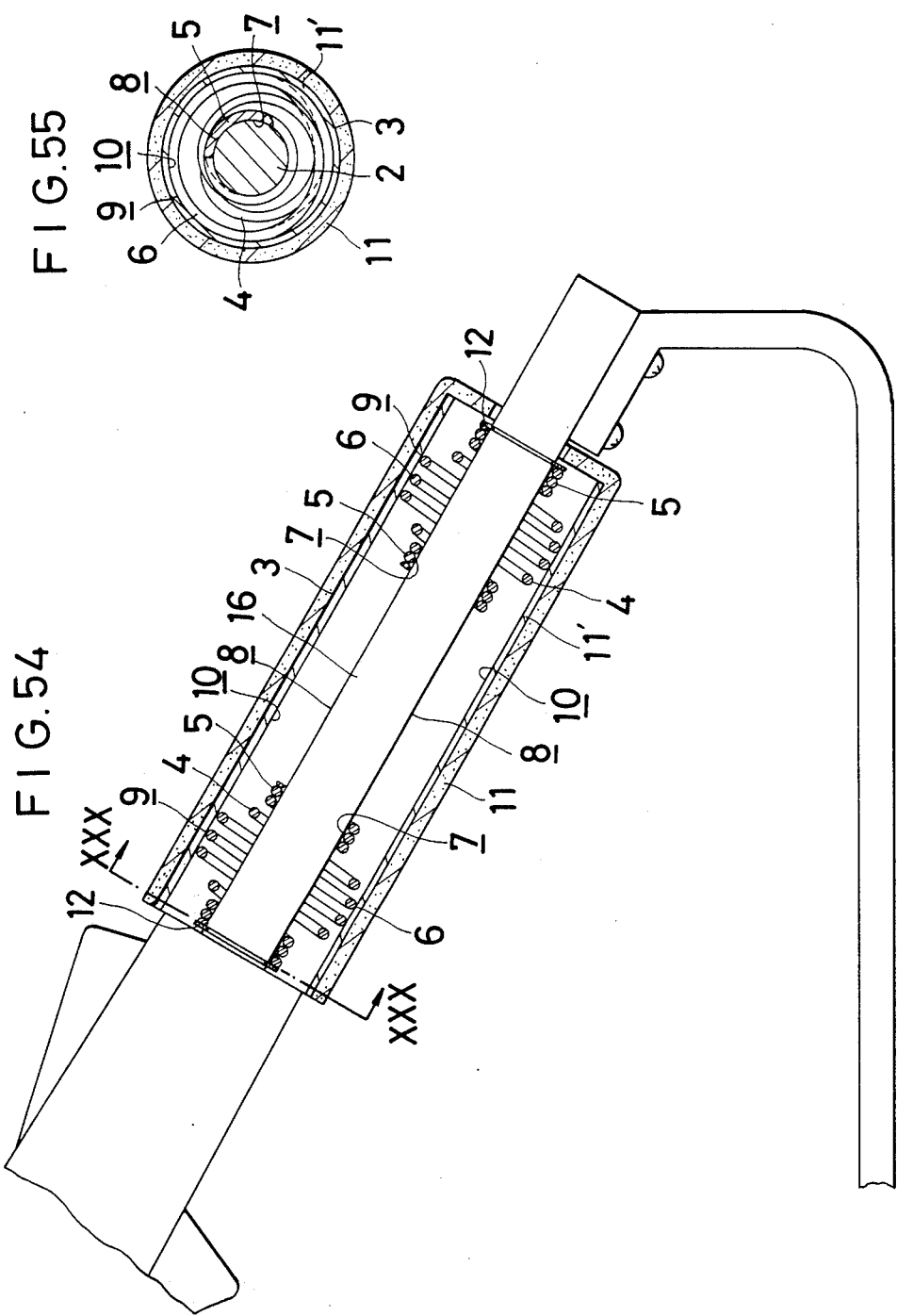

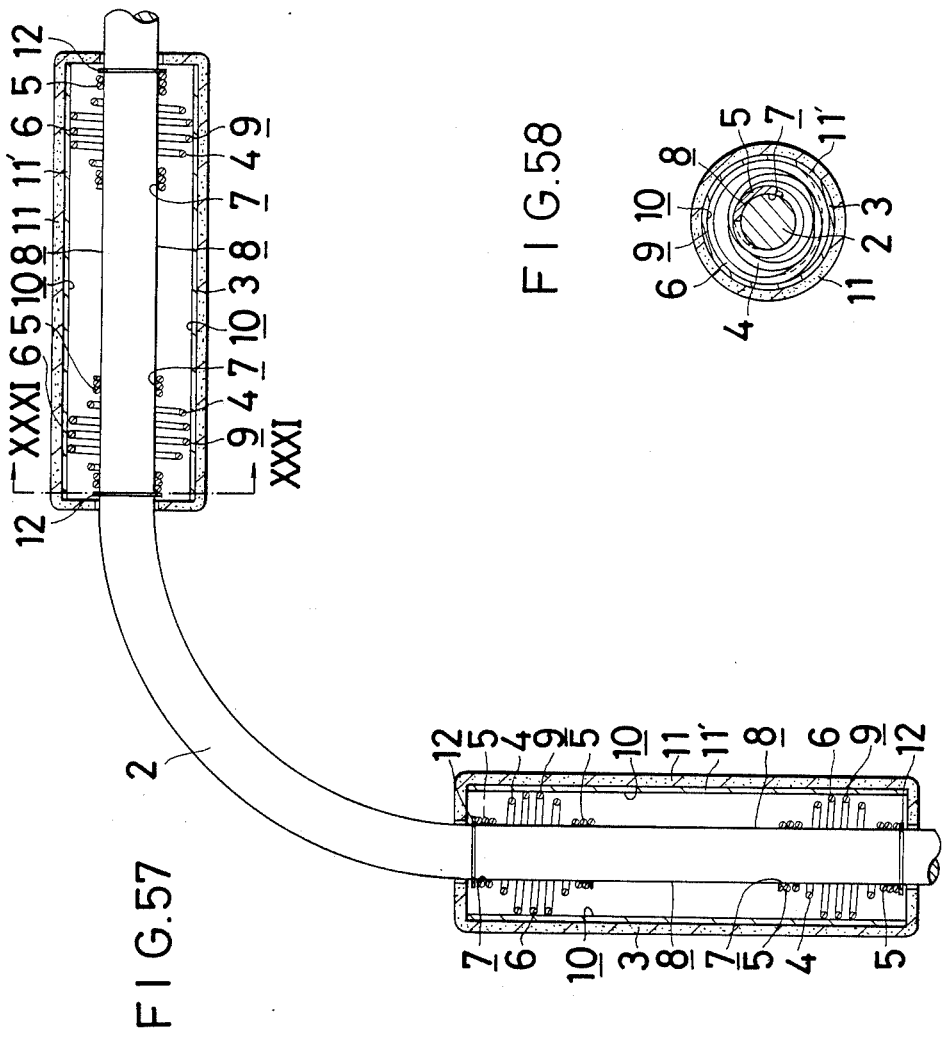

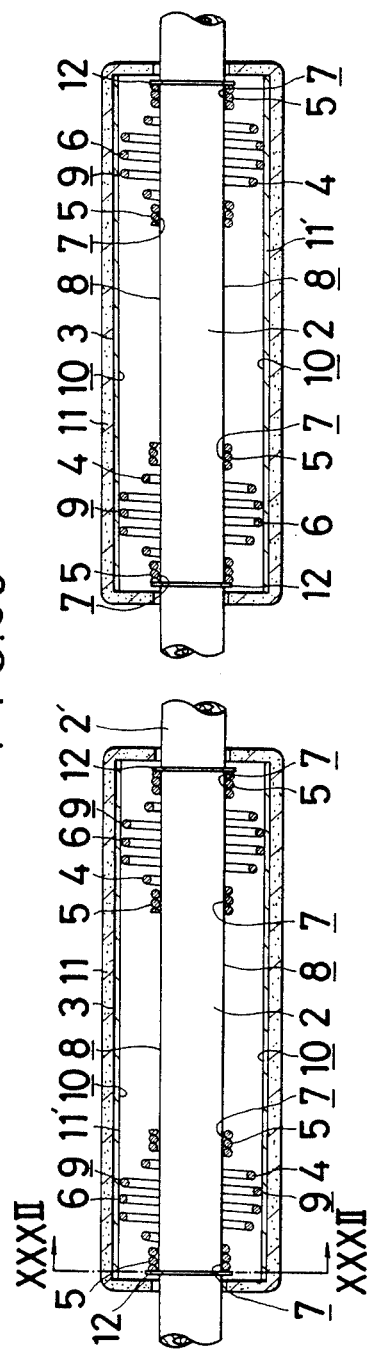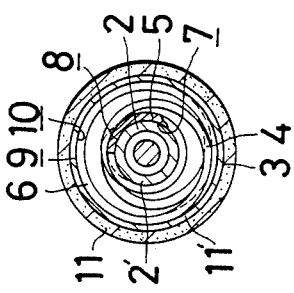

VIBRATION DAMPER

BACKGROUND OF THE INVENTION

This invention relates to a vibration damper, and more specifically to a vibration damper for the handle or grip of a machine, vehicle, or the like which is a source of vibration, such as a chain saw or motorcycle.

The support for manual control of a chain saw, motorcycle, mower, or other vibration-generating body is usually equipped with a cylindrical grip or the like for direct manipulation by the operator. Consequently, vibrations from the source are immediately transmitted to the support and the grip means, vibrating the hand or hands of the user, often so seriously as to impair his health. For example, the vibrations of chain saws in cutting operations are widely known to be responsible for Reynaud's disease. Attempts have heretofore been made to isolate the vibrations from those saws, motorcycles, and other similar sources to protect the human body. However, there has been no satisfactory solution proposed yet.

BRIEF SUMMARY OF THE INVENTION

It is, therefore, an object of the present invention to provide a vibration damper for the handles or grips of chain saws, motorcycles, and other vibration-generating mechanical bodies, thereby to protect the users against Reynaud's disease and other injurious effects upon health.

A more specific object of the invention is to provide a vibration damper which comprises a spring assembly of a special construction through which a handle or grip is joined to a vibrational mechanical body.

With the vibrational damper of the invention the vibrations, to be otherwise transmitted from the mechanical source to the user through the handle or grip, are substantially damped or absorbed.

The above and further objects and features of the invention will be apparent from the following detailed description taken in connection with the accompanying drawing. It is to be understood, however, that the description of the invention as applied to the handle or grip of a chain saw is for the purpose of illustration only and is not intended as a definition of the limits of the invention.

BRIEF EXPLANATION OF THE DRAWINGS

FIG. 54 is a enlarged sectional view of the portion C of FIG. 51;

FIG. 55 is a cross sectional view taken on the line XXX—XXX of FIG. 54;

FIG. 57 is a enlarged sectional view of the portion of FIG. 56;

FIG. 58 is a cross sectional view of FIG. 57;

FIG. 60 is an enlarged sectional view of the portion E of FIG. 59;

FIG. 61 is a cross sectional view taken on the line XXXII—XXXII of FIG. 60;

DETAILED DESCRIPTION OF THE INVENTION

Briefly stated, the vibration damper according to the invention comprises a support, such as an arm, of a vibrational mechanical body, a rigid cylindrical grip or handle provided concentrically with the support and adapted to be held by the hand of an operator for manipulation, and a pair of coiled or spiral springs disposed between the support and the grip. The pair of coiled springs are located at or near the opposite ends of said rigid cylindrical grip. Each spring consists of at least one small coiled portion, at least one large coiled portion and at least one conically and spirally coiled portion extending from said small coiled portion to said large coiled portion. Each small coiled portion is fixed to or engaged with the outer periphery of the support and each large coiled portion is fixed to or engaged with the inner surface of the rigid cylindrical grip. The grip may be made of metal, hard rubber or metal lined with hard or soft rubber.

In some embodiments, a resilient body such as rubber, elastomer or spring is inserted between the inner surface of the grip and the large coiled portion of the pair of the springs and/or between the outer surface of the support and the small coiled portion of the pair of the springs to enhance the damping effect of the present vibration damper.

In further embodiments, the pair of the coiled springs are embedded in resilient body such as rubber or elastomeric plastic material theoby to enhance the vibration damping effect of the present vibration damper.

Each spring may be fixed to the support by forming a radial inward or axial projection at the free end of the small coiled portion and a recess or hook means in said support for receiving said projection. Each spring may be fixed to the grip by forming a radial outward or axial projection at the free end of the large coiled portion and a recess or hook means in said grip for receiving the projection.

The vibration damper of the present invention remarkably reduces the vibrations in radial (vertical) direction as well as axial (horizontal) direction. The theory is not clear but it has been confirmed that it is essential for effective damping that the grip is a rigid cylindrical body and is supported by springs having a spirally and conically coiled middle portion. It has been found that only a pair of such springs located at or near both ends of the cylindrical rigid grip and inserted between the grip and the support is sufficient to attain the aimed objects.

Figure 1:
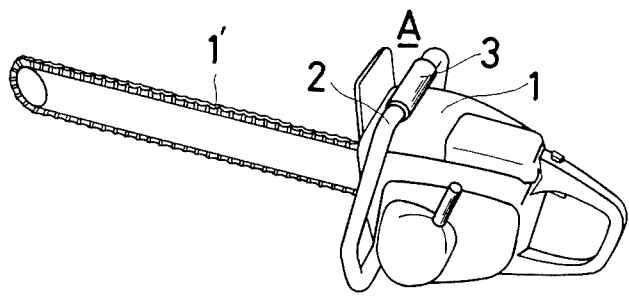
FIG. 1 is a perspective view of a chain saw incorporating a vibration dampers according to the invention.
Figure 2:
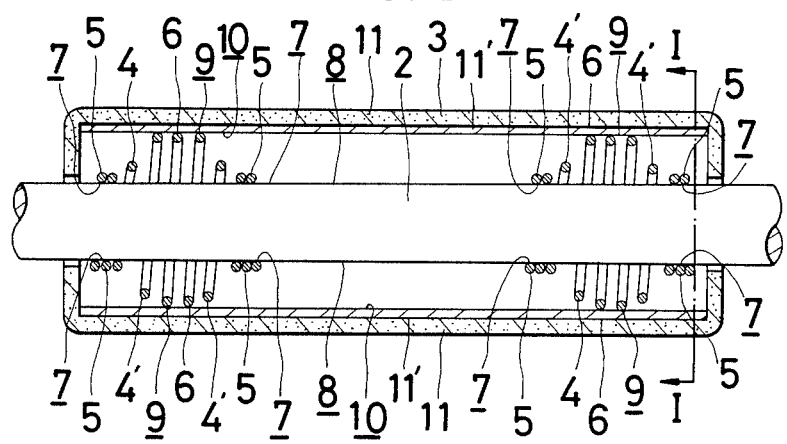
FIG. 2 is a sectional view of a vibration damper embodying the invention.
Figure 3:
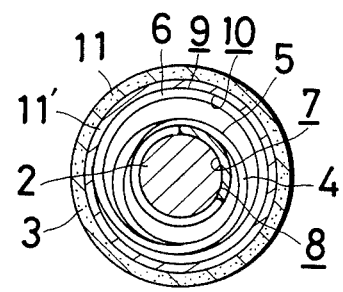
FIG. 3 is a cross sectional view taken on the line I—I of FIG. 2.

Referring now to FIG. 1 which illustrate a chain saw adapted to incorporate the vibration damper of the invention. The numeral 1 designates a housing accommodating the drives, hereinafter called the vibrational body because it constitutes a source of vibrations. The saw blade in the form of an endless chain is indicated at 28. The vibrational body 1 includes a support 2, such as an arm, to be gripped by the operator. A grip or handle 3 is sleeved over an upper portion of the support 2. The vibration damper according to the invention pertains to a structure joining the support 2 and the grip 3 together.

Throughout all ensuing figures similar reference numerals indicate similar members or portions.

FIGS. 2 through 13 illustrate various embodiments of vibration dampers adapted to be used in the chain saw illustrated in FIG. 1, wherein a pair of coiled springs 4 are disposed between a support 2 and a rigid cylindrical grip 3 provided concentrically with the support. Each of the springs 4 in each embodiment of FIGS. 2 through 13 except for the embodiment in FIGS. 6 and 7 consists of two small coiled portions 5, a large coiled portion 6 and conically and spirally coiled portions 4' connecting the small coiled portions 5 with the large coiled portion 6. These coiled springs 4 are disposed at both ends of the grip 3. The inner surfaces 7 of the small coiled portions 5 are securely fitted over the outer surface 8 of the support 2 and the outer surface 9 of the large coiled portion is securely fitted to the inner surface 10 of the cylindrical grip 3.

Figure 6:
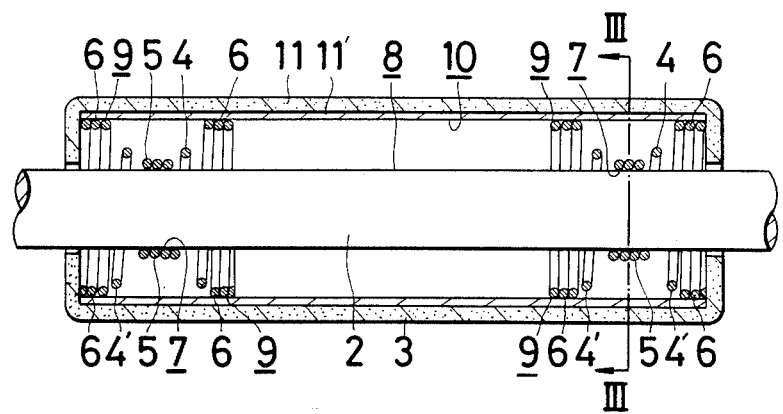
FIG. 6 is a sectional view of another embodiment of the invention.
Figure 7:
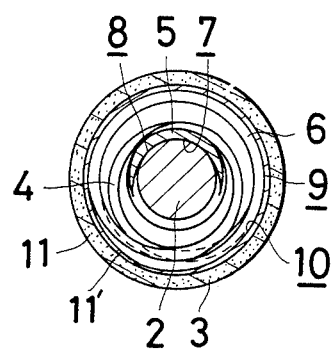
FIG. 7 is a cross sectional view taken on the line III—III of FIG. 6.

The embodiment illustrated in FIGS. 6 and 7 is substantially similar except that the springs 4 in which two large coiled portion 6 and a single small coiled portion 4' are used.

Figure 4:
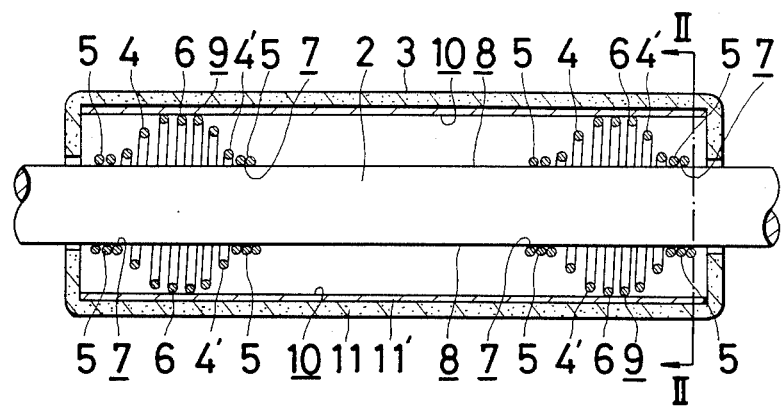
FIG. 4 is a sectional view of another vibration damper embodying the invention.
Figure 5:
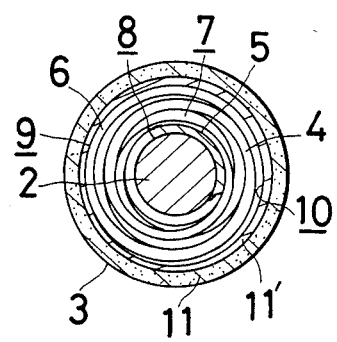
FIG. 5 is a cross sectional view taken on the line II—II of FIG. 4.

The spiral angle of the conically coiled portion 4' should be more than 180° (½ turn) for an efficient damping. A spiral angle of 360° (one turn) of the conically coiled portion 4' is illustrated in FIGS. 2, 3, 6, 7, 8, 9, 10, 11, 12 and 13 and a spiral angle of 720° (two turns) is illustrated in FIGS. 4 and 5.

Figure 8:
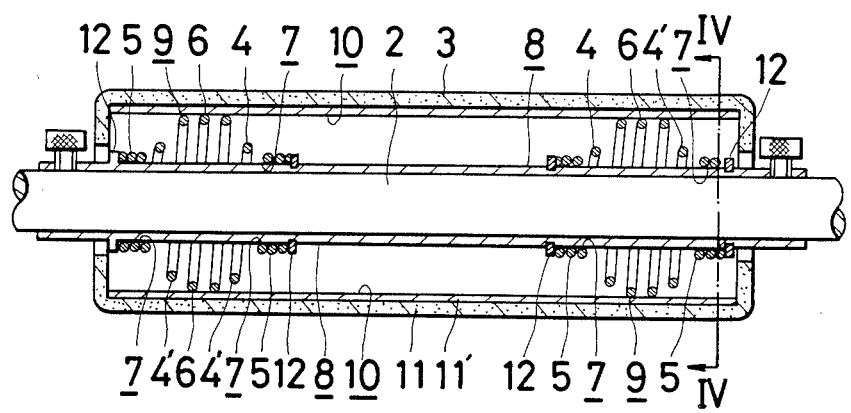
FIG. 8 is a sectional view of another embodiment.
Figure 9:
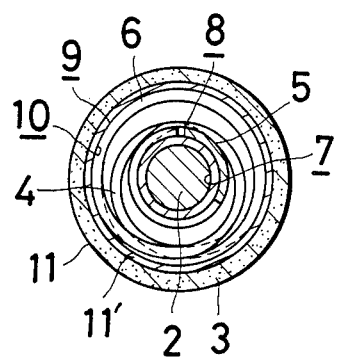
FIG. 9 is a cross sectional view taken on the line IV—IV of FIG. 8.
Figure 10:
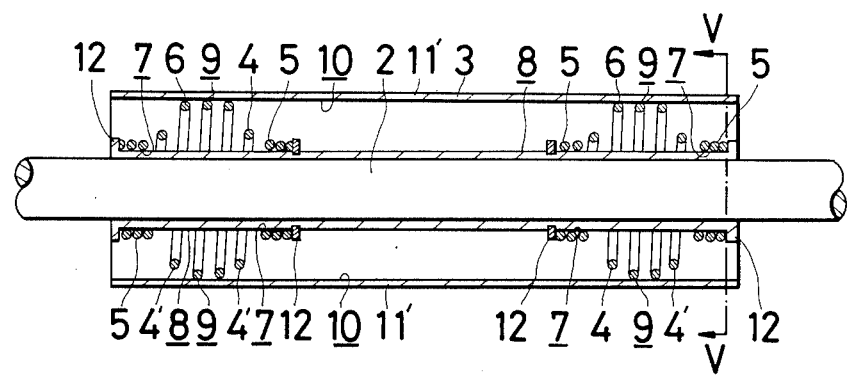
FIG. 10 is a sectional view of still another embodiment.
Figure 11:
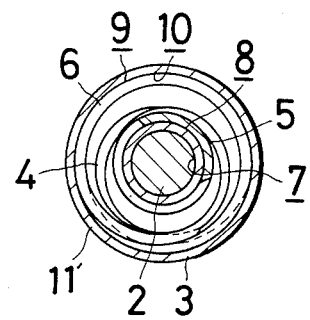
FIG. 11 is a cross sectional view taken on the line V—V of FIG. 10.
Figure 12:
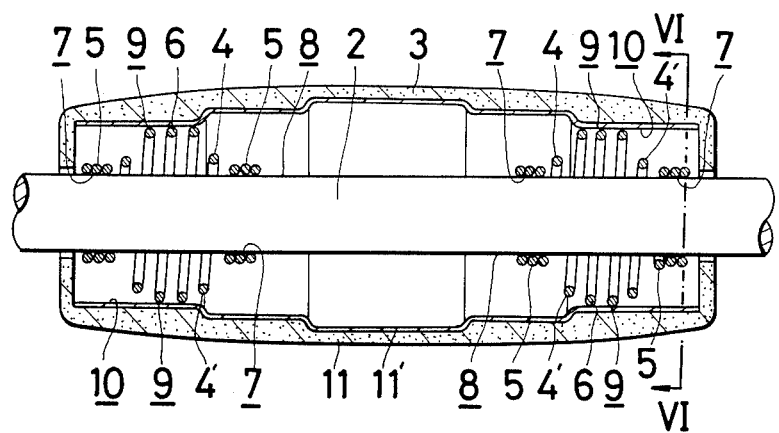
FIG. 12 a sectional view of yet another embodiment.
Figure 13:
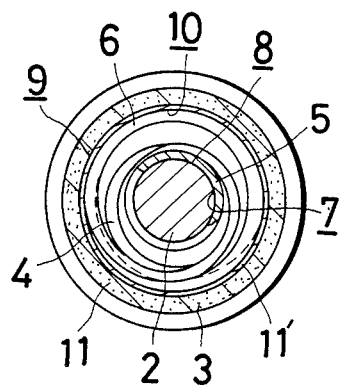
FIG. 13 is a cross sectional view taken on the line VI—VI of FIG. 12.
Figure 14:
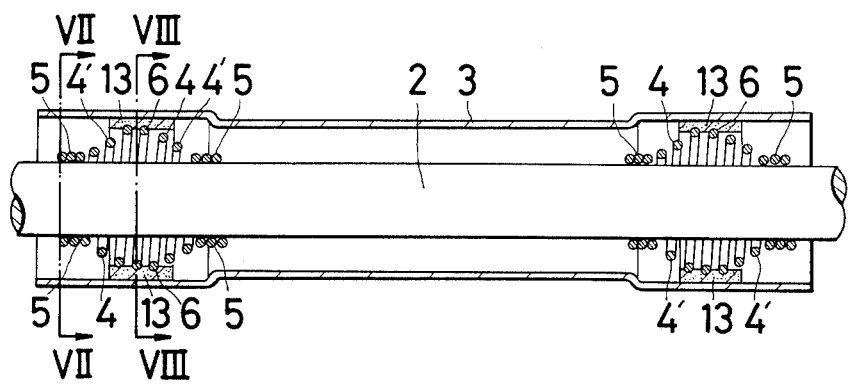
FIG. 14 is a sectional view of a further embodiment.
Figure 15:
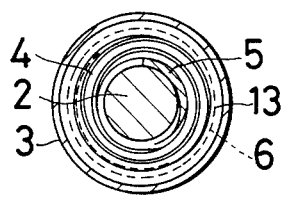
FIG. 15 is a cross sectional view taken on the line VII—VII of FIG. 14.
Figure 16:
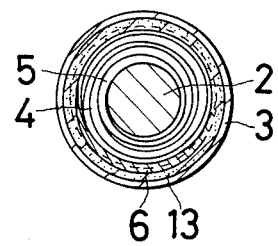
FIG. 16 is a cross sectional view taken on the line VIII—VIII of FIG. 14.
Figure 17:
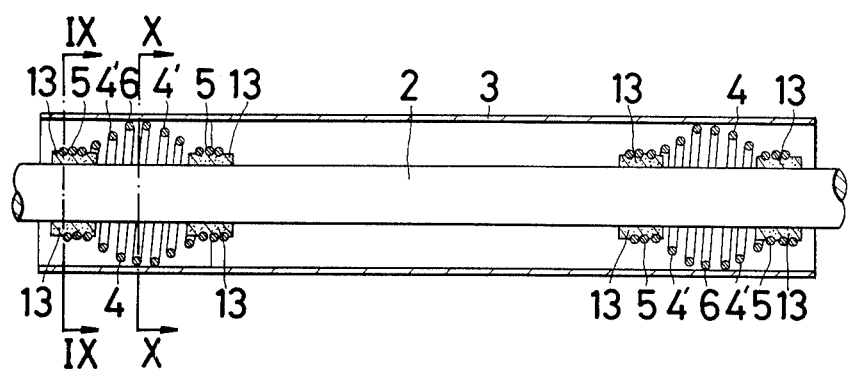
FIG. 17 is a sectional view of still a further embodiment.
Figure 18:
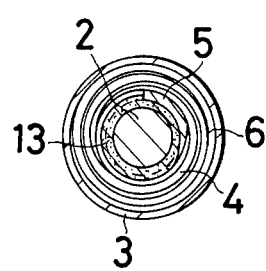
FIGS. 18 and 19 are cross sectional views taken on the lines IX—IX and X—X of FIG. 17, respectively.
Figure 19:
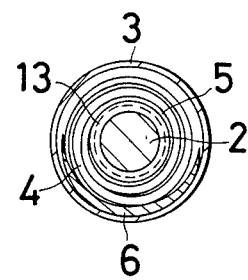

The rigid grip consists of a metal cylinder 11' and a rubber sleeve 11 (FIGS. 2 through 9, 12 and 13) or a single metal cylinder 11 (FIGS. 10 and 11). The springs 4 are securely held in place with use of an adhesive, brazing or retainers such as 12 (FIGS. 8, 10).

The vibration transmitted from the vibrational body to the grip by way of the support is drastically reduced or damped in these embodiment in cooperation of the conically coiled portion of the spring 4' with the mass of the rigid grip 3.

Figure 27:
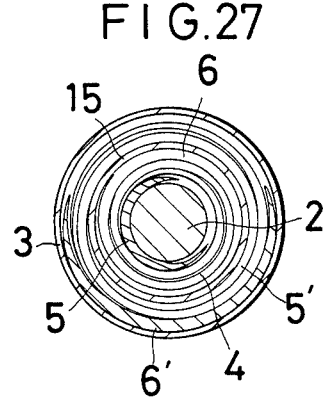
Figure 28:
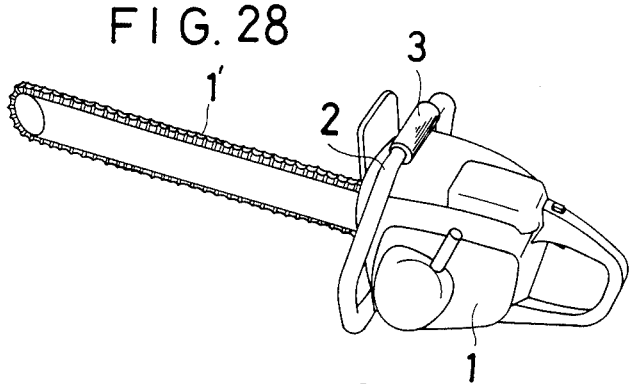
FIG. 28 is a perspective view of a chain saw in which the vibration dampers according to the embodiments shown in FIGS. 14-27 may be incorporated.

Referring to the embodiments illustrated in FIGS. 14 through 28, the vibration dampers utilized in a chain saw shown in FIG. 28 between a support or handle 2 and a grip 3. In each embodiment of these figures, the grip 3 is a metal cylinder, though it may be made of a metal inner cylinder and a rubber outer sleeve. The paired springs 4 inserted between the support 2 and the grip 3 consist of outer two small coiled portions 5, an inner large coiled portion 6 and two conically and spirally coiled portions 4' connecting these small and large coiled portions.

Figure 20:
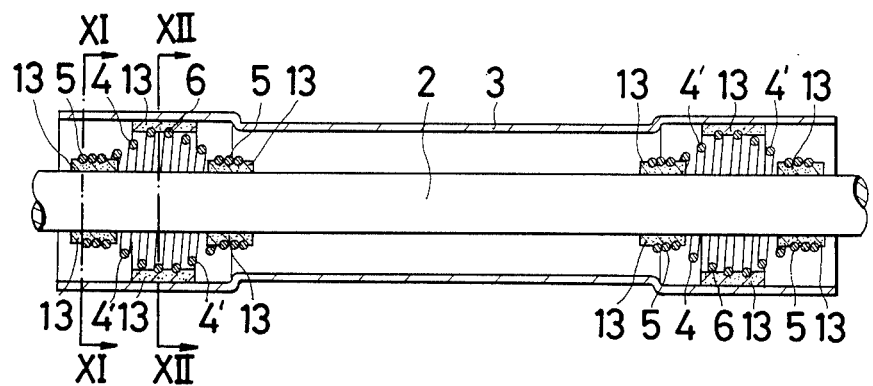
FIG. 20 is a sectional view of an even further embodiment.
Figure 21:
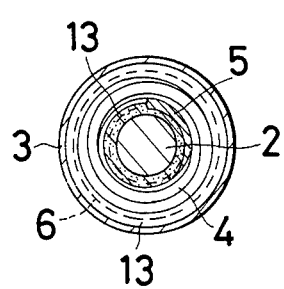
FIG. 21 is a cross sectional view taken on the line XI—XI of FIG. 20.
Figure 22:
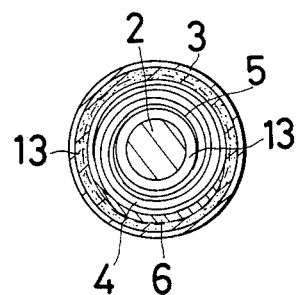
FIG. 22 is a cross sectional view taken on the line XII—XII of FIG. 20.
Figure 23:
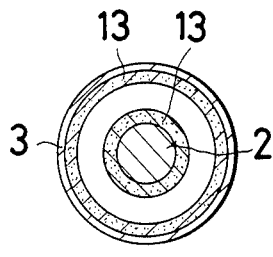
FIG. 23 is a cross sectional view explaining the arrangement of resilient bodies.
Figure 24:
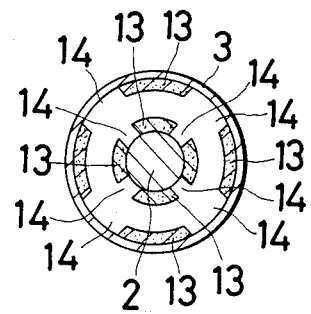
FIG. 24 is a sectional view of another embodiment.
Figure 25:
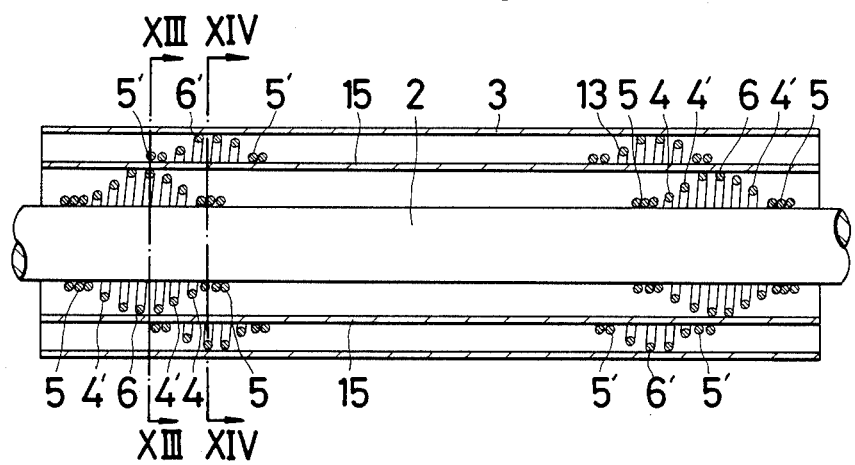
FIG. 25 is a sectional vew of a further embodiment.
Figure 26:
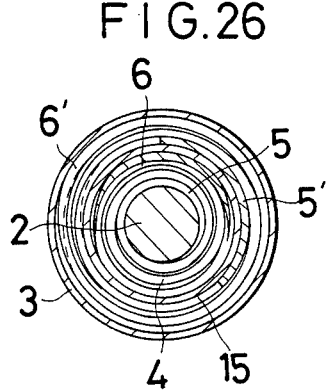
FIGS. 26 and 27 are cross sectional views taken on the lines XIII—XIII and XIV—XIV of FIG. 25, respectively.

Inserted and securely held between the inner surface of the grip 3 and the outer periphery of the and/or between the support 2 and the inner surface of the small coiled portions 5 large coiled portions 6 of the spring 4 are annular or cylindrical resilient bodies 13 of rubber or elastomer materal which enhances the damping effect of the vibration damper. The annular resilient bodies 13 inserted between the grip 3 and the springs 4 (FIGS. 14~16) or between the support 2 and the springs 4 (FIGS. 17~19) or in both places (FIGS. 20~22). Instead of annular resilient bodies 13 as schematically illustrated in FIG. 23, the resilient bodies 13 may be divided into segments with spacings 14 as shown in FIG. 24. Also, as the resilient bodies 13, coiled springs may be used. More specifically, as shown in FIGS. 25~27 a metal cylinder 15 and coiled springs 13 consisting of small coiled portion 5',5' and a large coiled portion 6' attached to the cylinder 15 are inserted in between the outer periphery of the springs 4 and the grip 3.

According to the above embodiments, the vibration is primarily absorbed or damped by the springs 4 and the remaining vibration is absorbed by the resilient bodies 13, whereby the vibration damping effect is enhanced.

Figure 29:
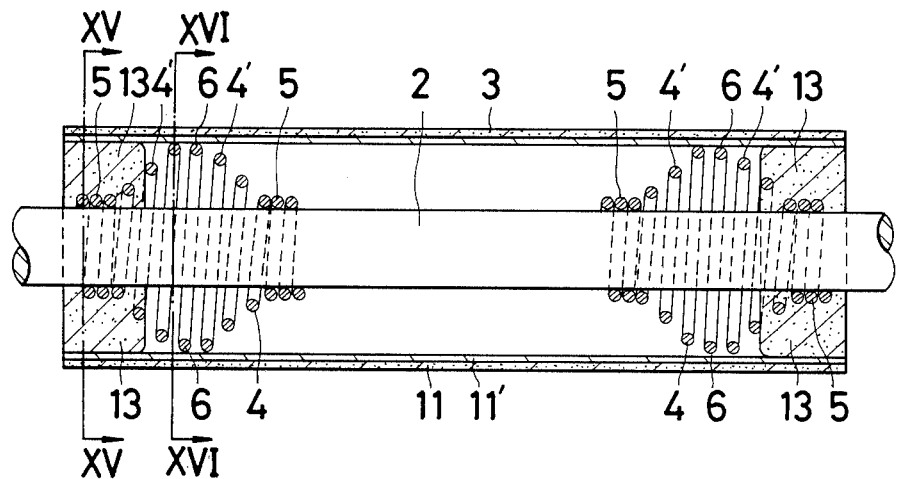
FIG. 29 is a sectional view of another embodiment.
Figure 30:
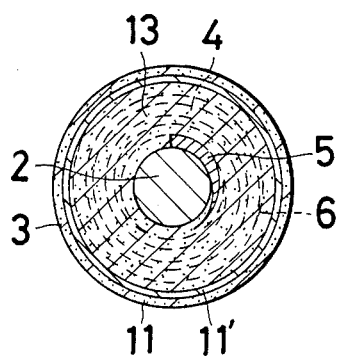
FIGS. 30 and 31 are cross sectional views taken on the lines XV—XV and XVI—XVI of FIG. 29 respectively.
Figure 31:
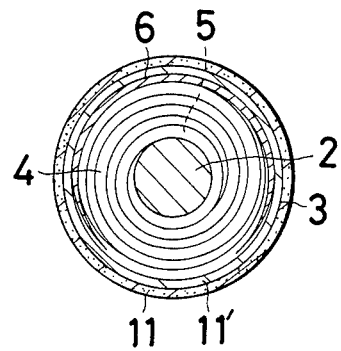
Figure 32:
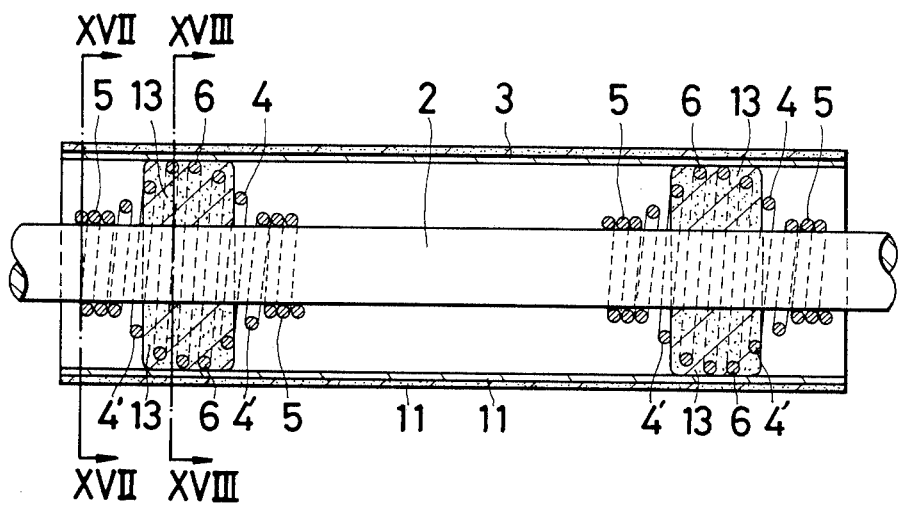
FIG. 32 is a sectional view of a further embodiment.
Figure 33:
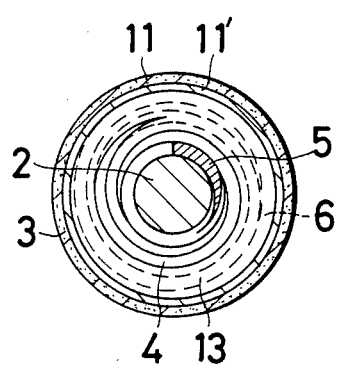
FIGS. 33 and 34 are cross sectional views taken on the line XVII—XVII and XVIII—XVIII of FIG. 32, respectively.
Figure 34:
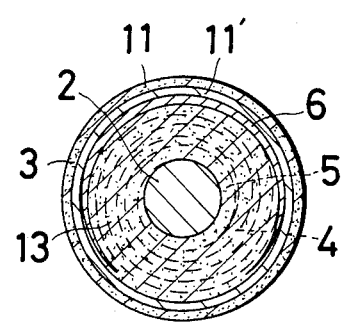
Figure 35:
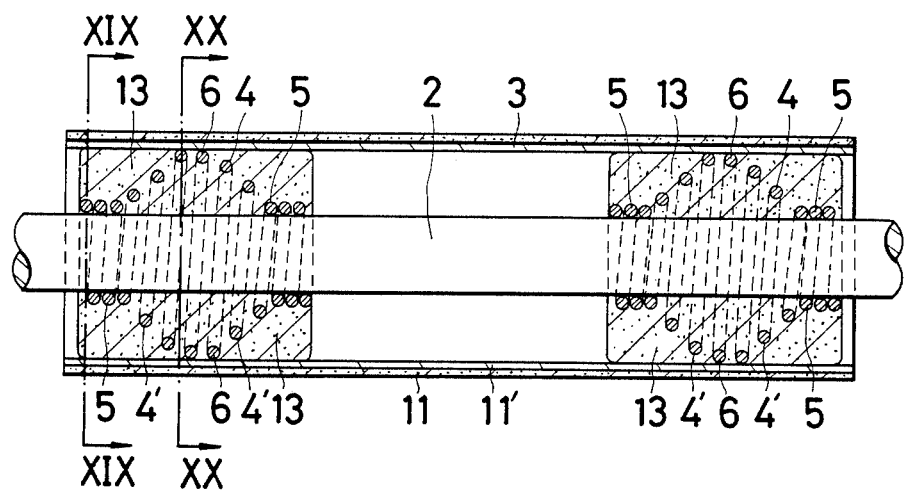
FIG. 35 is a sectional view of a still further embodiment.
Figure 36:
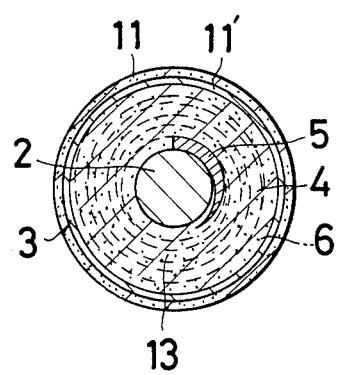
FIGS. 36 and 37 are cross sectional views taken along the lines XIX—XIX and XX—XX of FIG. 35, respectively.
Figure 37:
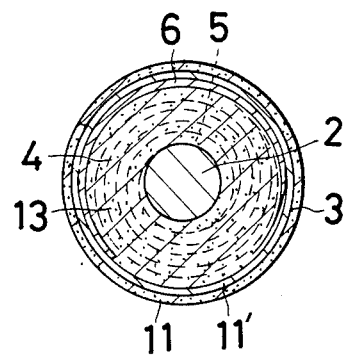
Figure 38:
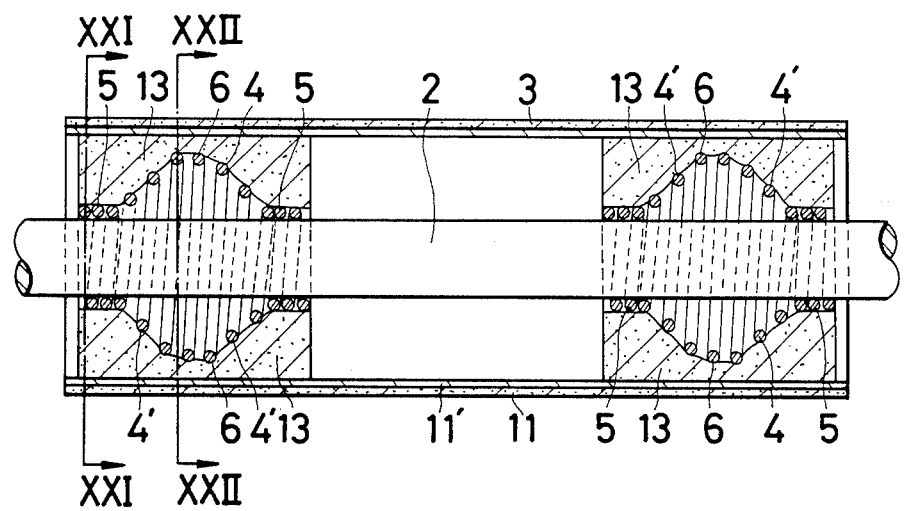
FIG. 38 is a sectional view of a yet further embodiment.
Figure 39:
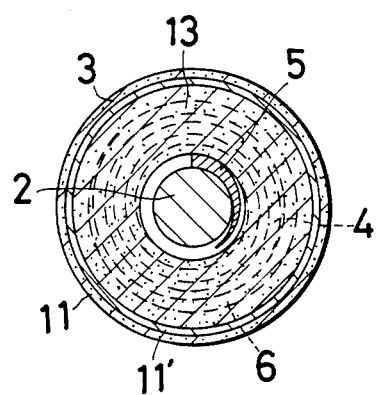
FIGS. 39 and 40 are cross sectional views taken along the lines XXI—XXI and XXII—XXII of FIG. 38, respectively.
Figure 40:
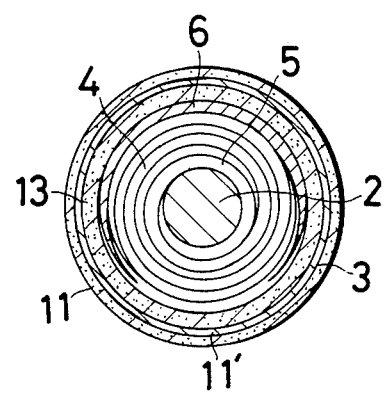
Figure 41:
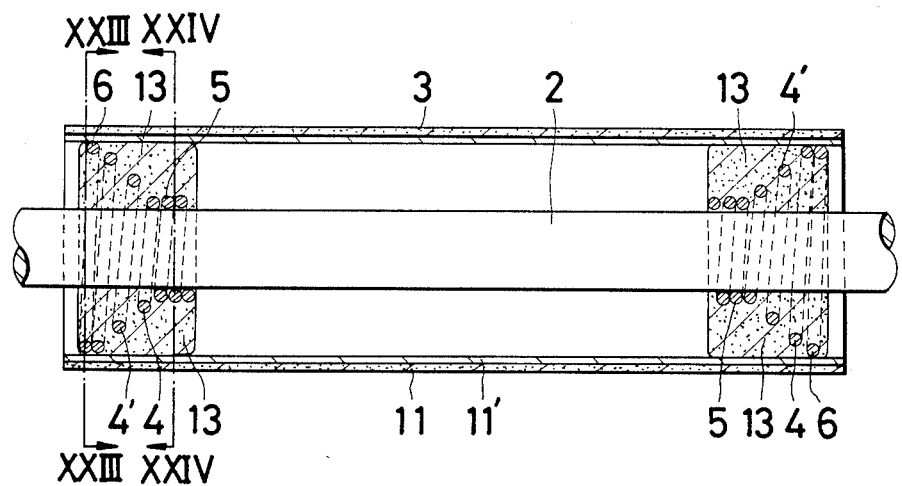
FIG. 41 is a sectional view of an additional embodiment.
Figure 42:
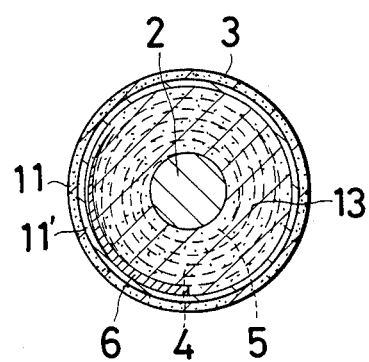
FIGS. 42 and 43 are cross sectional views taken along the lines XXIII—XXIII and XXIV—XXIV of FIG. 41, respectively.
Figure 43:
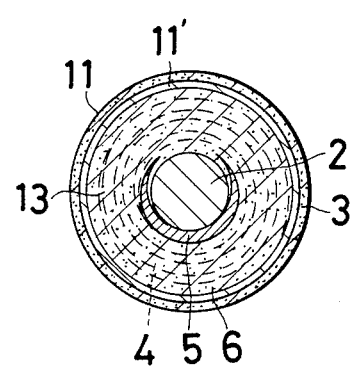
Figure 44:
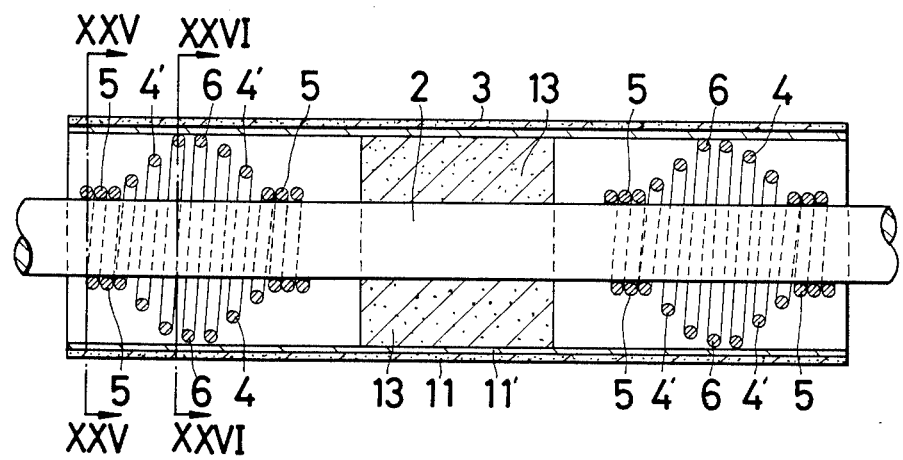
FIG. 44 is a sectional view of a further additional embodiment.
Figure 45:
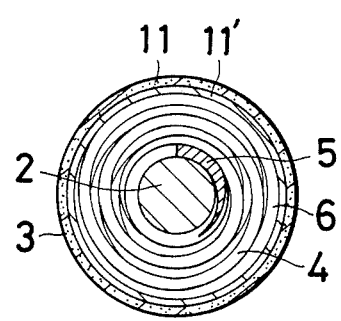
FIGS. 45 and 46 are cross sectional views taken on the lines XXV—XXV and XXVI—XXVI of FIG. 44, respectively.
Figure 46:
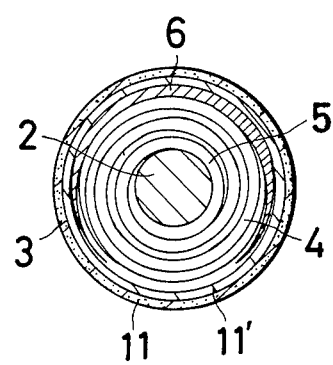
Figure 47:
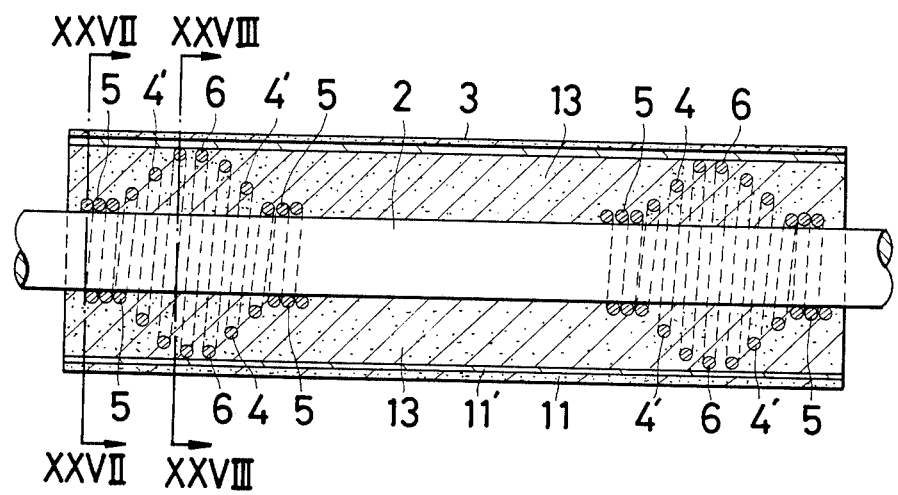
FIG. 47 is a sectional view of a even further embodiment.
Figure 48:
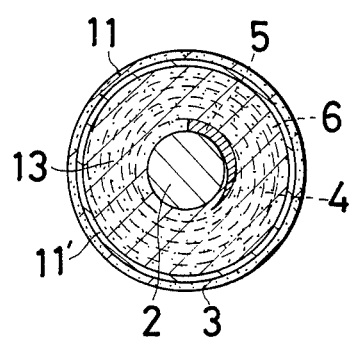
FIGS. 48 and 49 are cross sectional views taken along the lines XXVII—XXVII of FIG. 47.
Figure 49:
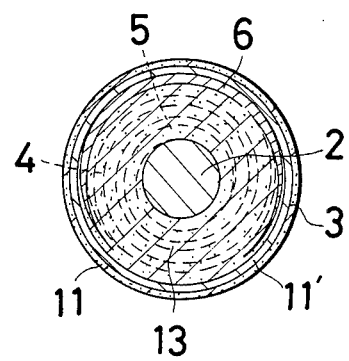
Figure 50:
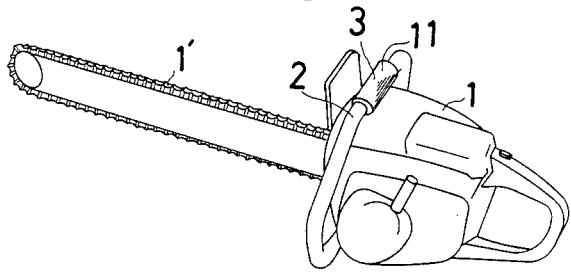
FIG. 50 is a perspective view of a chain saw in which the embodiment shown in FIGS. 29-49 may be incorporated.

Referring to FIGS. 29 through 50 which illustrate embodiments of vibration dampers adapted to be used with a chain saw as shown in FIG. 50, one or more resilient bodies 13 are used as auxiliary vibration absorbing means. The resilient bodies 13 of rubber or elastomer fill the annular space between the support 2 and the grip 3 which, in these embodiments, consists of a metal inner cylinder 11' and an outer rubber sleeve 11. The resilient bodies may be held at any desired axial positions. In FIGS. 29~31, a pair of resilient bodies 13 are formed by casting at the small coiled portions of the springs 4 at the outer extremities so that the a part of the springs 4 are embodded in the resilient bodies. In FIGS. 32~34, the resilient bodies 13 fill the space between the grip 3 and the support 2 at the large coiled portions of the springs, so that the middle portions of the springs are embodded in the resilient bodies 13. In FIGS. 35~37 the entire springs 4 are embedded in the resilient bodies 13. In FIGS. 38~40, the resilient bodies are inserted between the grip 3 and the outer periphery of the springs 4. FIGS. 41~43 are similar to FIG. 35 except that each of the pair of coiled springs 4 consists of a small coiled portion 5, large coiled portion 6 and a conically and spirally coiled portion 4' connecting therebetween. In FIGS. 44~46, the resilient body 13 is inserted at the middle point between the pair of springs 4. In FIGS. 47~49, the resilient body 13 fills the entire space between the support 2 and the grip 3. The advantages resulting from these embodiments are similar to those from the embodiments in FIGS. 14~28.

Figure 51:
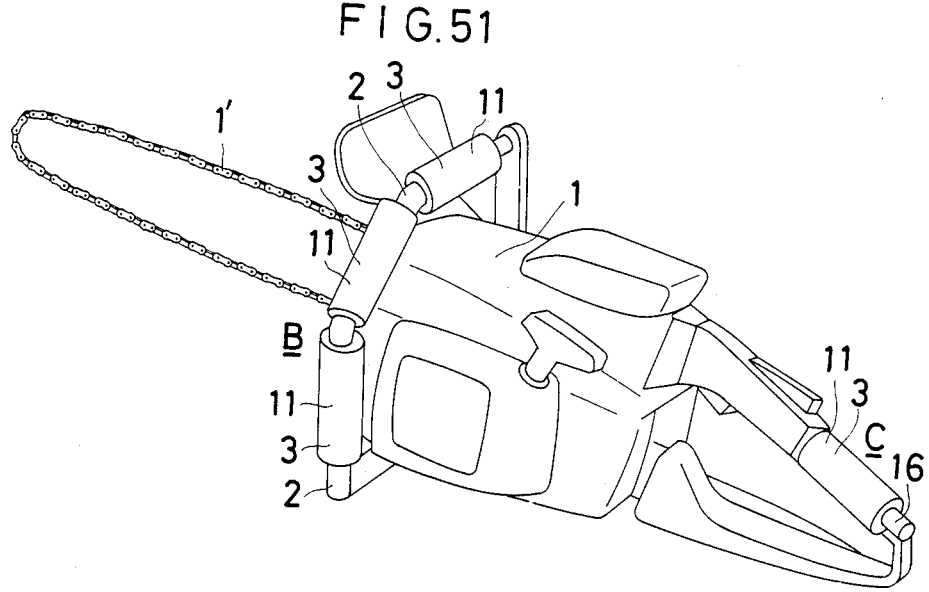
FIG. 51 is a perspective view of a chain saw in which the embodiment shown in FIGS. 52-58 are incorporated.

Reference is made to FIGS. 51 through 58, which illustrate an embodiment applied to a chain saw as shown in FIG. 51. The chain saw in FIG. 51 is provided with two supports or handles 2 and 16 on which grips 3 (three grips at B and one grips at C) are mounted and the vibration is absorbed or damped by the vibration damper inserted between the support 2 and the grips 3 or the support 16 and the grip 3.

Figures 52, 53:
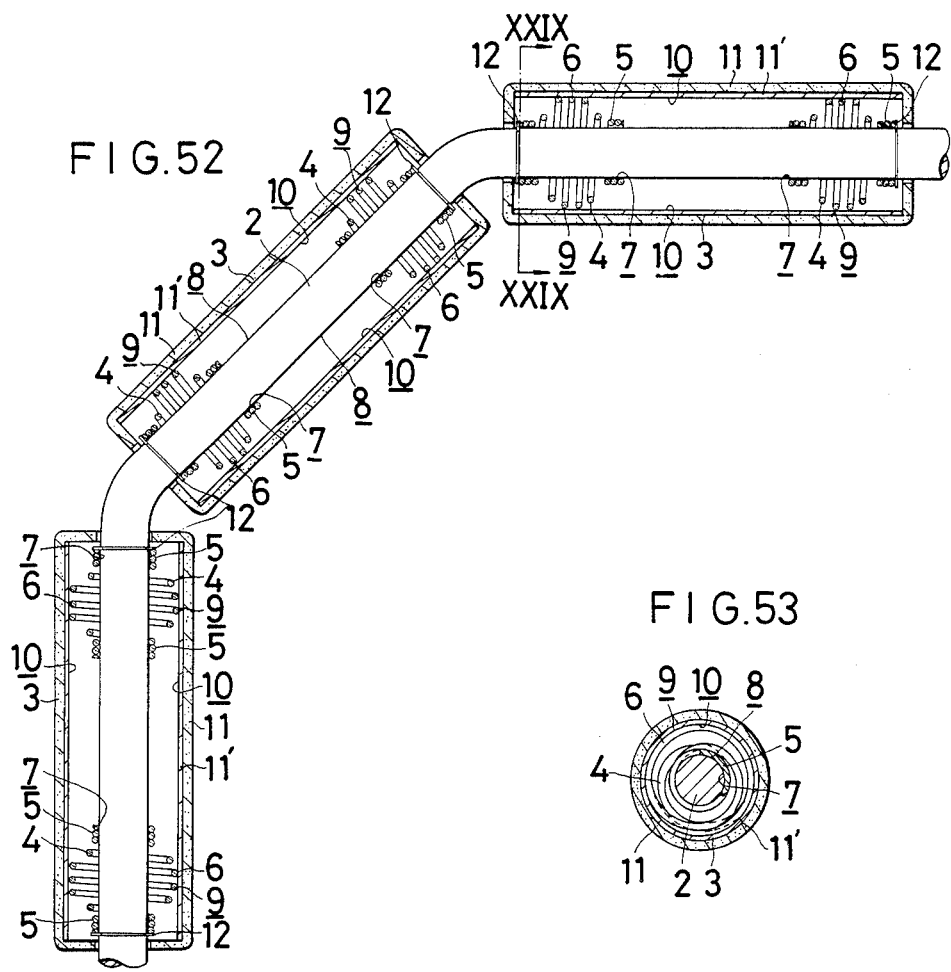
FIG. 52 is a enlarged sectional view of the portion B of FIG. 51.
FIG. 53 is a cross sectional view taken on the line XXIX—XXX of FIG. 52.

Referring to FIGS. 52 and 53 which are enlarged cross sectional views of the portion B in FIG. 54, three similar vibration dampers are mounted on the bent support 2. The construction of each damper is substantially the same as that shown in FIGS. 2 and 3 except that the outer extremities of the pair of springs 4 are held by retainer rings 12 filled in annular grooves on the periphery of the support 2.

FIGS. 54 and 55 are enlarged cross sectional views of the portion C in FIG. 53. The construction of the vibration damper is substantially the same as that shown in FIGS. 53 and 54. According to this embodiment, plurality of vibration dampers are employed and are adapted to be held by hands in various angular positions and thus the chain saw is easy to handle while attaining the aimed vibration damping.

Figure 56:
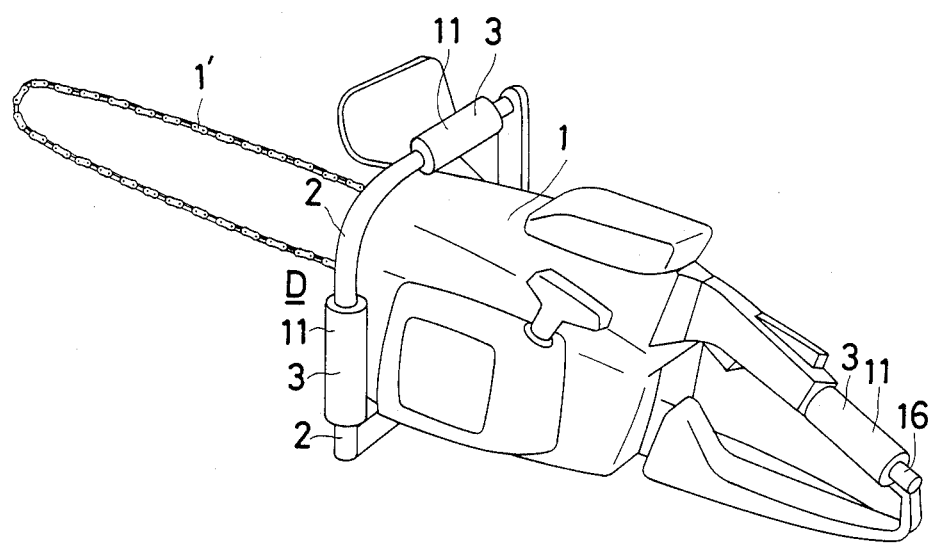
FIG. 56 is a perspective view of a further embodiment.

FIGS. 56~57 illustrate a modification of the embodiment in FIGS. 51~55, wherein the handle or support 2 corresponding to the position B in FIG. 51 is provided with two grips 3 instead of three as shown by D in FIG. 56. Each vibration damper comprising the springs 4 and the grip 3 has substantially the same construction as those in FIGS. 51~56.

Figure 59:
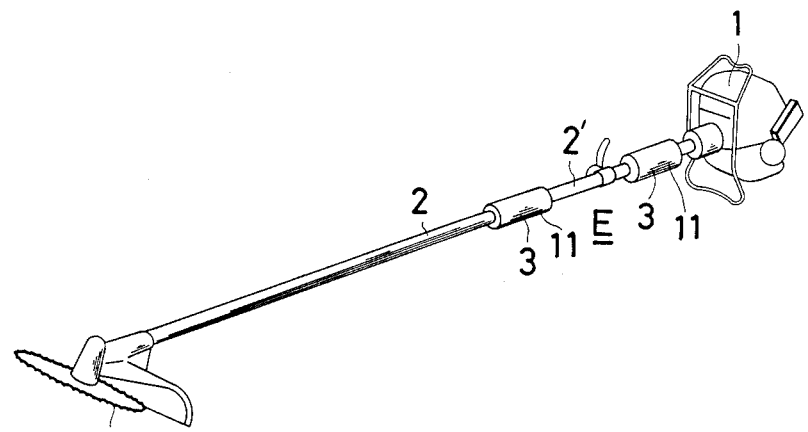
FIG. 59 is a perspective view of a mower in which the present invention is incorporated.

Referring to FIGS. 59 through 61, an embodiment applied to a mower is illustrated. The mower comprises a power source 1, handles or supports 2,2' through which a transmission mean is extended and a saw 17 connected to the transmission means. A pair of grips 3, 3 are mounted on the support 2' with vibration dampers according the invention. FIGS. 60 and 61 are enlarged cross sectional views of the vibration dampers which have substantially the same construction as the dampers shown in FIGS. 52~54.

Figure 62:
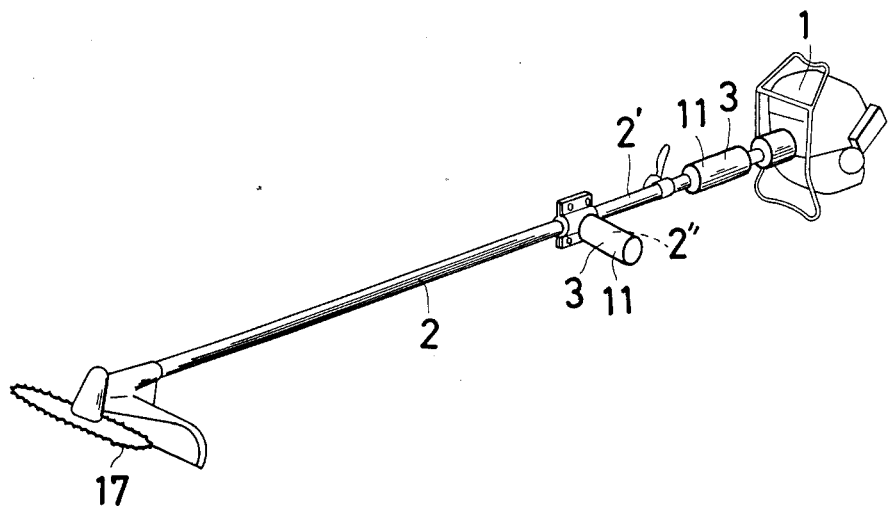
FIG. 62 is a perspective view of an another embodiment of a mower in which the present invention is employed.
Figure 64:
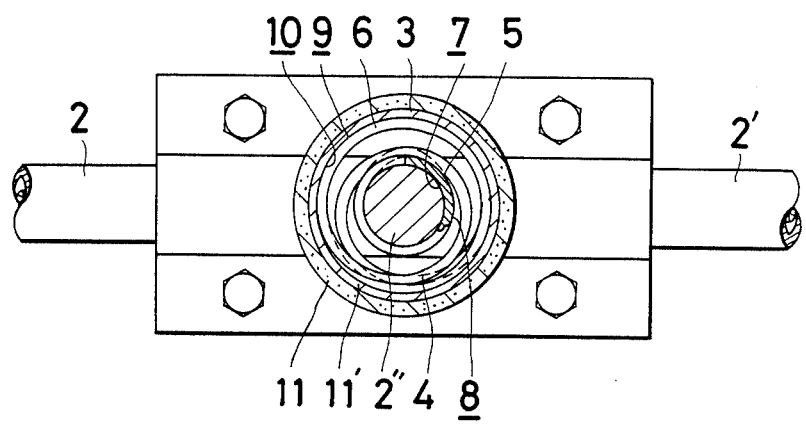
FIG. 64 is a cross sectional view taken along the line XXXIII—XXXIII of FIG. 63.
Figure 63:
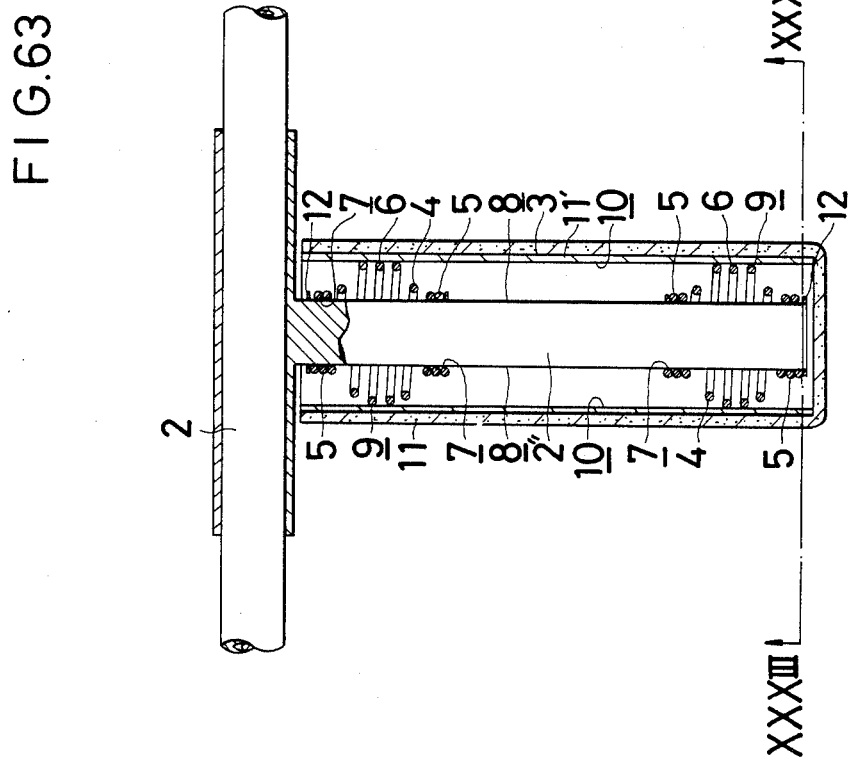
FIG. 63 is an enlarged sectional view of the portion F of FIG. 62.

FIGS. 62 through 64 illustrate another embodiment which is applied to a mower. The mower is provided a handle or support 2' and a branched handle or support 2" and grips 3 are mounted on the respective supports 2' and 3' with interposed vibration dampers according to the present invention. As shown in FIGS. 63 and 64, each vibration damper comprising springs 4 and grip 3 is substantially the same in construction as those shown in FIGS. 51~56.

Figure 65:
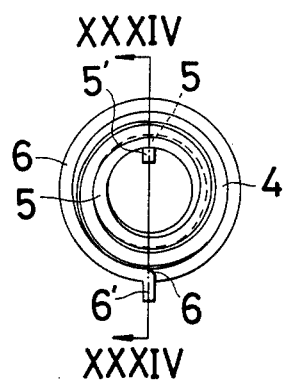
FIG. 65 is an end view of an embodiment of a spring utilized in the present invention.
Figure 66:
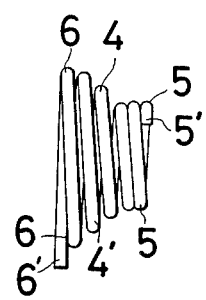
FIG. 66 is an elevational view of the spring shown in FIG. 65.
Figure 67:
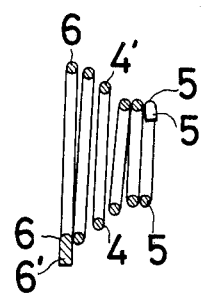
FIG. 67 a cross sectional view taken on the line XXXIV—XXXIV of FIG. 65.
Figure 68:
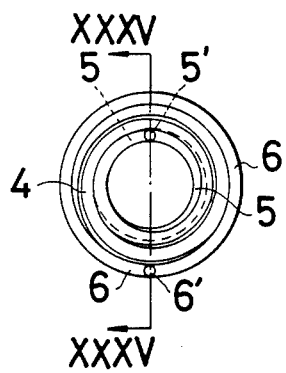
FIG. 68 is an end view of another embodiment of a spring.
Figure 69:
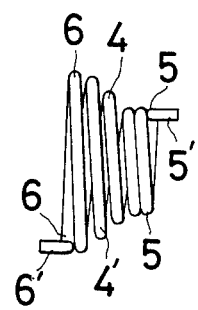
FIG. 69 is an elevational view of the spring shown in FIG. 68.
Figure 70:
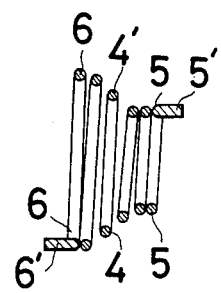
FIG. 70 is a cross sectional.
Figure 71:
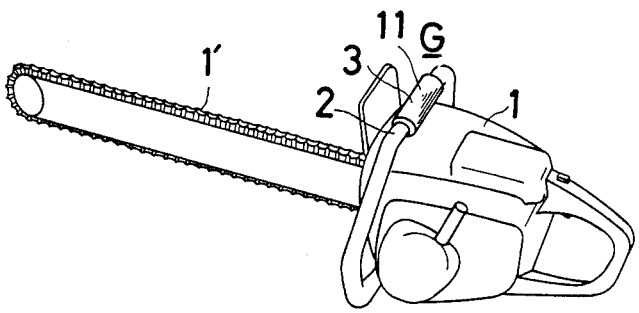
FIG. 71 is a perspective view of a chain saw in which the present invention is incorporated.
Figure 72:
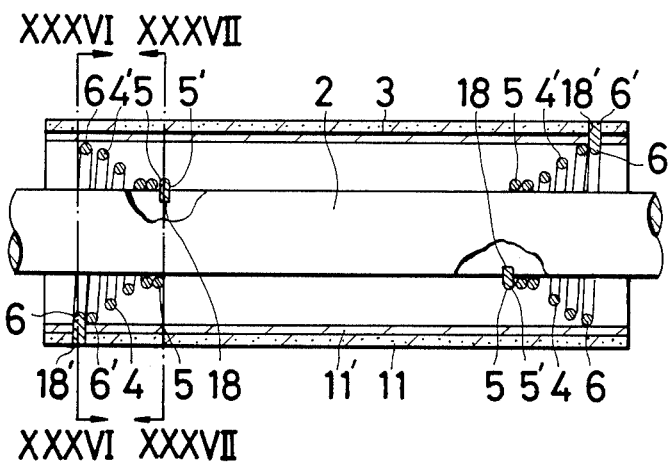
FIG. 72 is an enlarged view of the portion G of FIG. 71.
Figure 73:
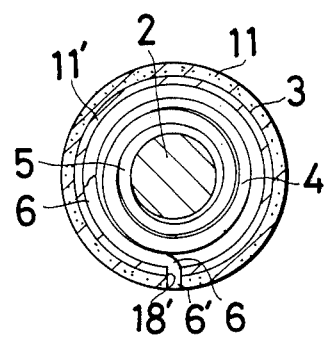
FIGS. 73 and 74 are cross sectional views taken on the lines XXXVI—XXXVI and XXXVII—XXXVII, respectively.
Figure 74:
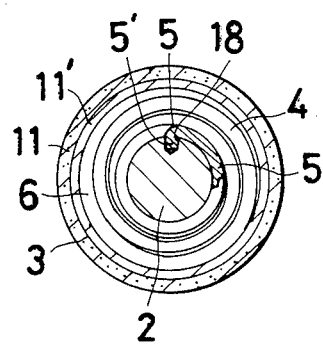

FIGS. 65 through 67 illustrated a further embodiment of the present invention which is applied to a chain saw as illustrated in FIG. 71. The springs 4 utilized in this embodiment may have the structure as shown in FIGS. 65~67 or FIGS. 68~70, In FIG. 65~67, the spring 4 consists of a small coiled portion 5, a large coiled portion 6 and a conically and spirally coiled portion 4' connecting the portions 5 and 6. The inner extremity of the small coiled portion 5 is provided with a short radial projection 5' and the outer extremity of the large coiled section is provided with a short radial projection 6', which are retained in a recess 18 of the support 2 and in a hole 18' of the grip 3, respectively, as illustrated in FIGS. 72~74. Alternative structure of the spring 4 is illustrated in FIGS. 68~70. The spring in these figures is different from that in FIGS. 65~67 only in the point that the projections 5' and 6' are axial rather than radial. The projections 5' and 6' are retained by hook means (not shown) fixed to the support 2 and the grip 3, respectively.

It should be noted that the present invention can be modified without departing from the spirit of the present invention. For example, the vibration damping coil in horizontal position may have an eccentric axis in such manner that the spring is deviated upwardly.

I claim:

1. A damper for use in damping vibrations in a mechanical body such as a chain saw, mower, motorcycle and the like, said said damper comprising:

a support for supporting said body for manipulation thereof;

a rigid cylindrical grip mounted about said support and defining an inner surface and opposite ends; and a pair of vibration-damping springs disposed between said support and said grip one each at said opposite ends of said grip, each spring consisting of at least one small coiled portion, at least one large coiled portion and at least one conically and spirally coiled portion extending between the small coiled portion and the large coiled portion, said small coiled portion being fixedly supported on the support and said large coiled portion fixedly supporting the inner surface of said grip, at least one of said large coiled portion and said conically and spirally coiled portion having axially spaced apart turns, whereby vibrations produced in said body are damped by said vibration damping springs for effectively minimizing vibration of said grip, each said spring comprising a large coiled midportion, small coiled opposite end portions, a first helical portion extending from said midportion to one of said end portions, and a second helical portion extending oppositely from said midportion to the other of said end portions.

2. The damper of claim 1 wherein said large coiled portion is defined by a plurality of turns.

3. The damper of claim 1 wherein said small coiled portion is defined by a plurality of turns.

4. A damper for use in damping vibrations in a mechanical body such as a chain saw, mower, motorcycle and the like, said said damper comprising:

a support for supporting said body for manipulation thereof;

a rigid cylindrical grip mounted about said support and defining an inner surface and opposite ends;

a pair of vibration-damping springs disposed between said support and said grip one each at said opposite ends of said grip, each spring consisting of at least one small coiled portion, at least one large coiled portion and at least one conically and spirally coiled portion extending between the small coiled portion and the large coiled portion, said small coiled portion being fixedly supported on the support and said large coiled portion fixedly supporting the inner surface of said grip, at least one of said large coiled portion and said conically and spirally coiled portion having axially spaced apart turns, whereby vibrations produced in said body are damped by said vibration damping springs for effectively minimizing vibration of said grip; and a resilient element between said grip and spring for further damping said vibrations.

5. The damper of claim 4 wherein said resilient element is disposed on said inner surface of the grip.

* * * * *